(12) United States Patent
Saleh et al.

(10) Patent No.: US 8,872,879 B2
(45) Date of Patent: *Oct. 28, 2014

(54) SYSTEM AND METHOD FOR CONTROLLING VIDEOCONFERENCE WITH TOUCH SCREEN INTERFACE

(75) Inventors: Youssef Saleh, Arlington, MA (US); Mark Duckworth, Merrimack, NH (US); Gopal Paripally, North Andover, MA (US)

(73) Assignee: Polycom, Inc., San Jose, CA (US)

( * ) Notice: Subject to any disclaimer, the term of this patent is extended or adjusted under 35 U.S.C. 154(b) by 1460 days.

This patent is subject to a terminal disclaimer.

(21) Appl. No.: 11/307,194

(22) Filed: Jan. 26, 2006

(65) Prior Publication Data

US 2007/0171273 A1    Jul. 26, 2007

(51) Int. Cl.
*H04N 7/14* (2006.01)

(52) U.S. Cl.
CPC .................................. *H04N 7/14* (2013.01)
USPC ................... 348/14.08; 348/14.09; 348/14.12

(58) Field of Classification Search
USPC .................... 348/14.01–14.16; 345/173, 690; 715/753, 755, 751
See application file for complete search history.

(56) References Cited

U.S. PATENT DOCUMENTS

| | | | |
|---|---|---|---|
| 4,516,156 A | 5/1985 | Fabris et al. | |
| 5,767,897 A * | 6/1998 | Howell | 348/14.07 |
| 5,872,922 A | 2/1999 | Hogan et al. | |
| 6,256,033 B1 | 7/2001 | Nguyen | |
| 6,313,853 B1 | 11/2001 | Lamontage et al. | |
| 6,803,906 B1 | 10/2004 | Morrison et al. | |
| 6,919,880 B2 | 7/2005 | Morrison et al. | |
| 6,947,032 B2 | 9/2005 | Morrison et al. | |
| 7,355,593 B2 | 4/2008 | Hill et al. | |
| 7,428,000 B2 | 9/2008 | Cutler et al. | |
| 7,532,206 B2 | 5/2009 | Morrison et al. | |

(Continued)

FOREIGN PATENT DOCUMENTS

| | | |
|---|---|---|
| EP | 1178683 | 2/2002 |
| EP | 1503588 | 2/2005 |

(Continued)

OTHER PUBLICATIONS

Examiner's first report of Australian Patent Application No. 2007200098, dated Apr. 10, 2008.

(Continued)

*Primary Examiner* — Melur Ramakrishnaiah
(74) *Attorney, Agent, or Firm* — Wong, Cabello, Lutsch, Rutherford & Brucculeri, LLP

(57) ABSTRACT

A videoconferencing system includes a touch screen display device and a videoconferencing unit. The display device displays video data for the videoconference and generates touch data based on user selections relative to the touch screen. The videoconferencing unit is operatively coupled to the touch screen device by a video connection and a data interface connection, for example. The unit establishes and conducts a videoconference with one or more endpoints via a network. The unit sends video data to the display device and receives touch data from the device. The received touch data is used to control operation of the videoconferencing system. The received touch data can be used to initiate a videoconference call, change an operating parameter, change orientation of a camera, initiate a picture-in-picture display, access a menu, access memory, change a source of video data, initiate a whiteboard display, and access a screen of a connected device.

25 Claims, 5 Drawing Sheets

(56) References Cited

U.S. PATENT DOCUMENTS

| | | | |
|---|---|---|---|
| 2002/0002629 A1 | 1/2002 | Fukushima | |
| 2004/0217946 A1* | 11/2004 | Hamano | 345/173 |
| 2004/0254982 A1* | 12/2004 | Hoffman et al. | 709/204 |
| 2005/0104864 A1* | 5/2005 | Zhang et al. | 345/173 |
| 2005/0128285 A1 | 6/2005 | Berenguer | |
| 2006/0026535 A1* | 2/2006 | Hotelling et al. | 715/863 |

FOREIGN PATENT DOCUMENTS

| | | |
|---|---|---|
| JP | 2005-521340 | 7/2005 |
| WO | 94/07327 A1 | 3/1994 |
| WO | WO 9407327 A1 * | 3/1994 |
| WO | 9637069 | 11/1996 |
| WO | 03081892 A2 | 10/2003 |

OTHER PUBLICATIONS

Office Action from corresponding Japanese patent application No. 2007-013886 and translation, dated Dec. 2, 2009, 3-pgs.
European Search Report in counterpart EP Appl. No. EP 07000565.7, dated Sep. 16, 2011.
Examination Report in counterpart EP Appl. No. EP 07000565.7, dated Feb. 12, 2013.
First Office Action in copending U.S. Appl. No. 13/008,280, mailed Nov. 28, 2012.
Reply to First Office Action in copending U.S. Appl. No. 13/008,280, filed Mar. 27, 2013.
Smart Technologies, "SMART—3000i Features," obtained from http://www2.smarttech.com/, copyright 2006, 6-pgs.
Smart Technologies, "Rear Projection SMART—3000i," copyright 2005, 2-pgs.
Smart Technologies, "Rear Projection SMART Board (TM) Interactive Whiteboard," copyright 2003, 1-pg.
Smart Technologies, "Rear Projection SMART Board (TM) Interactive Whiteboard," copyright 2003-2005, 3-pgs.
Smart Technologies, "Room Control Module for the 3000i," copyright 2004-2005, 1-pg.
Smart Technologies, "User's Guide: ConferencePilot(TM)," copyright 2004, 11-pgs.
Polycom, "Polycom(R) 3000iPower(TM) Integrated Solution," undated, 2-pgs.
Polycom, "iPower(TM) Product Line," Apr. 2003, 4-pgs.
Boeckeler Instruments, "Pointmaker(R) UTROL(R)-MT A/V Remote Control System," copyright 1994-2002, 2-pgs.
Boeckeler Instruments, "Pointmaker(R) PVI(TM)-83 Multiple-Sync Video Maker," copyright 1994-2004, 2-pgs.
Boeckeler Instruments, "Pointmaker(R) PVI(TM)-83 Multiple-Sync Video Maker with Keyboard: User's Manual," copyright 1995-2003, 168-pgs.
Chinese First Office Action dated Mar. 27, 2009 re: corresponding Patent Application No. 200710007201.4.

* cited by examiner

SYSTEM AND METHOD FOR CONTROLLING VIDEOCONFERENCE WITH TOUCH SCREEN INTERFACE

FIELD OF THE DISCLOSURE

The subject matter of the present disclosure relates to a system and method for controlling a videoconference with a touch screen interface.

BACKGROUND OF THE DISCLOSURE

Typically, users of videoconferencing systems use remote controls to operate and control the systems. In addition, control panels, tablet input devices, keypads, or web interfaces can be used to operate and control the systems. When using a hand held remote, a user aims the remote at the videoconferencing system and navigates through numerous selections and menus of a user interface to operate and control the system. Tablet input devices and keyboards typically must be appropriately connected to the videoconferenceing system, and proper connection may be difficult for users. For videoconferences, users may also wish to set up a document camera or a computer with annotation tools for the user to be able to add writing and annotations to the videoconference. Unfortunately, document cameras and computers with annotation tools may be difficult to set up and use with videoconferenceing systems.

One prior art videoconferencing system known in the art is the 3000iPower available from Polycom, Inc. The 3000iPower includes a Polycom iPower 9800 and a Rear Projection SMART Board™ 3000i interactive whiteboard from SMART Technologies, Inc. The iPower 9800 has a PC-based design so that it essentially operates as a computer. The 3000iPower allows computer images to be projected and viewed within a videoconference call, and the 3000iPower offers touch screen controls that provide access to conference applications. A user can use a pen from a pen tray of the 3000iPower and make notes on a whiteboard or highlight important information.

The subject matter of the present disclosure is directed to overcoming, or at least reducing the effects of, one or more of the problems set forth above.

SUMMARY OF THE DISCLOSURE

A videoconferencing system includes a touch screen display device and a videoconferencing unit. The display device displays video data for the videoconference and generates touch data based on user selections relative to the touch screen. The videoconferencing unit is operatively coupled to the touch screen device by a video connection and a data interface connection, for example. The unit establishes and conducts a videoconference with one or more endpoints via a network. The unit sends video data to the display device and receives touch data from the device. The received touch data is used to control operation of the videoconferencing system. The received touch data can be used to initiate a videoconference call, change an operating parameter, change orientation of a camera, initiate a picture-in-picture display, access a menu, access memory, change a source of video data, initiate a whiteboard display, and access a screen of a connected device.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
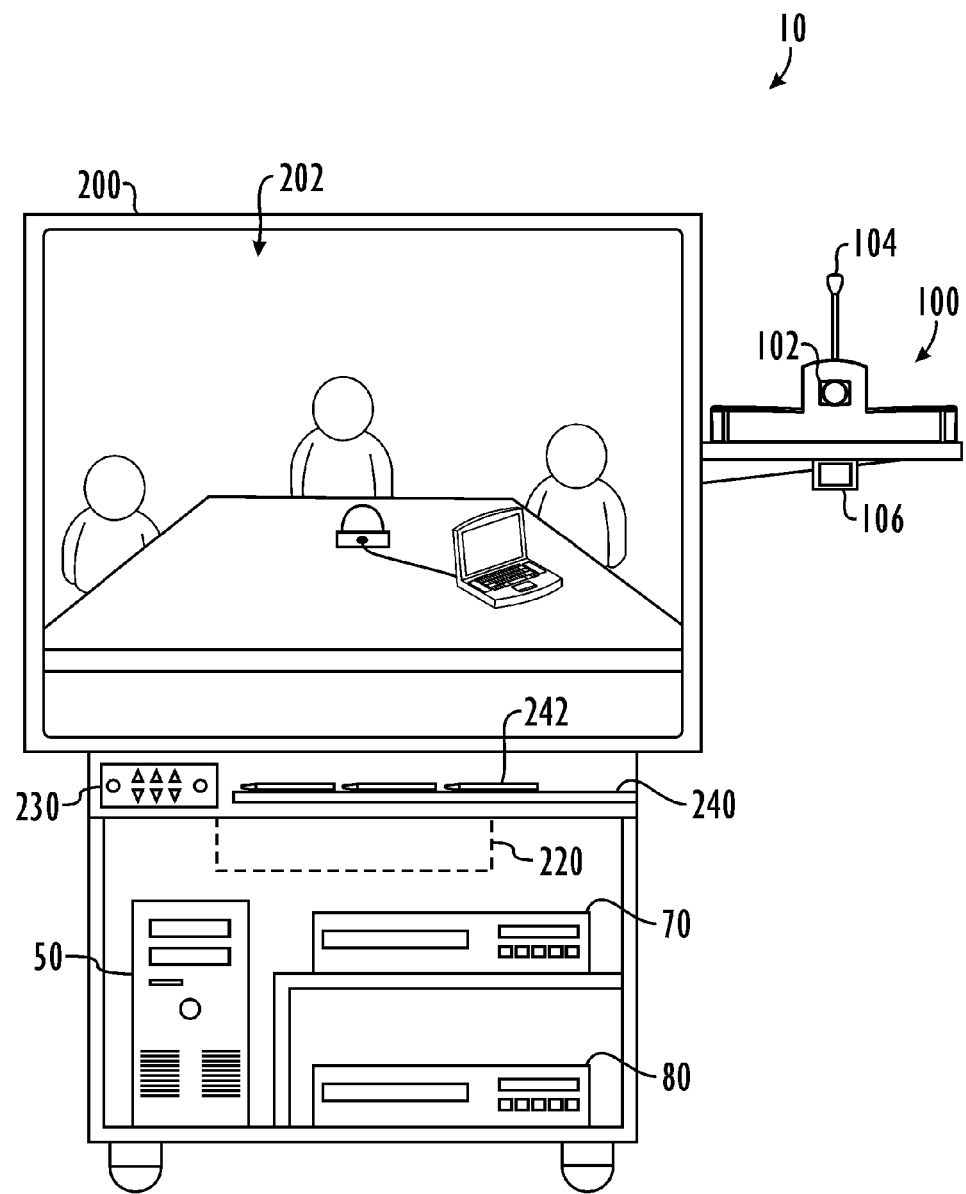
FIG. 1 illustrates an embodiment of a videoconferencing system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, an embodiment of a videoconferencing system 10 according to certain teachings of the present disclosure is illustrated. The videoconferencing system 10 includes a videoconferencing unit 100 and a touch screen display device 200. The videoconferencing system 10 can further include one or more peripheral devices, such as a computer (either laptop or desktop) 50, a Video Cassette Recorder (VCR) 70, and a Digital Versatile Disc (DVD) player 80. In one embodiment, the videoconferencing unit 100 is a VSX 8000 available from Polycom, Inc., the Assignee of the present disclosure, and the touch screen display device 200 is a 3000i model SMART Board available from SMART Technologies of Canada. In an alternative embodiment, the videoconferencing unit 100 and the touch screen display device 200 can be integrated together for the videoconferencing system 10.

The videoconferencing unit 100 is used to establish and conduct a videoconference with remote endpoints (not shown) via a network. The videoconferencing unit 100 has a camera 102 and a microphone 104. Depending on the implementation, the unit 100 can have other common components, such as an Infrared (IR) detector 106. The touch screen display device 200 is capable of both displaying video to the user and receiving touch and annotations from the user. In one embodiment, the touch screen display device 200 is a video monitor or the like having optical sensors surrounding the screen 202 for detecting when a user touches or writes on an area of the screen 202. For example, the video monitor can be part of a conventional Television display, a flat panel display, or other display known in the art. The touch screen display device 200 can also use other touch screen technologies known in the art.

As the 3000i model SMART Board, the device 200 includes a projection screen 202, an integrated Extended Graphics Array (XGA) projector 220, a control panel 230, and a tray 240. The device 200 also includes an audio system (not shown). To detect when a user touches the screen, the device 200 uses digital cameras (not shown) to detect objects and movement relative to the display screen 202. As discussed below, the control panel 230 of the display device 200 includes buttons configured to operate in conjunction with the videoconferencing unit 100. The tray 240 has various tools 242, such as pens and erasers. Optical sensors (not shown) on the tray 240 are used to detect when a user picks up a certain pen or eraser tool 242 from the tray 240.

Figure 2A:
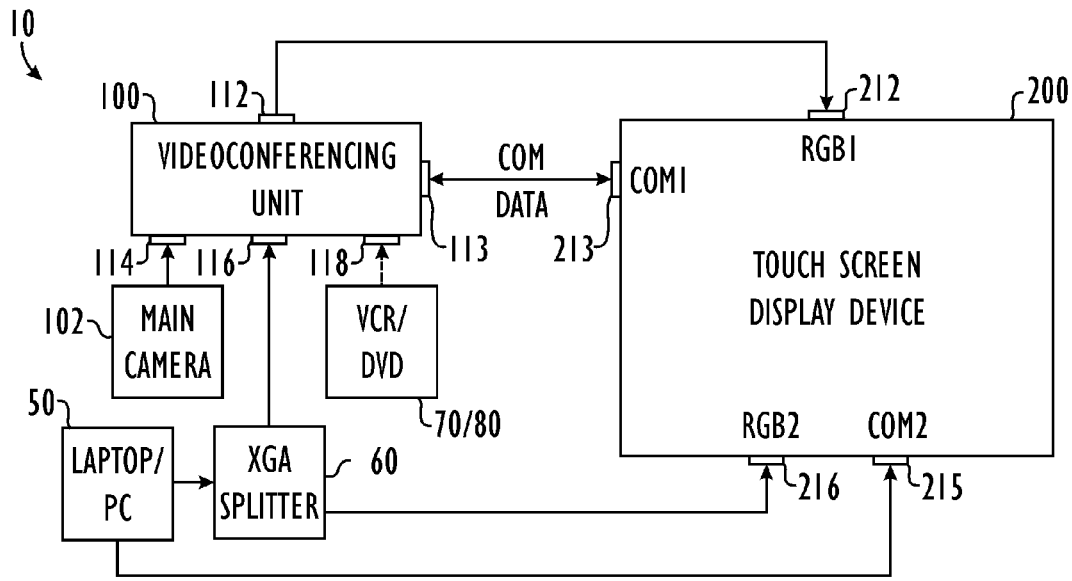
FIG. 2A illustrates a schematic diagram of an embodiment of the videoconferencing system.
Figure 2B:
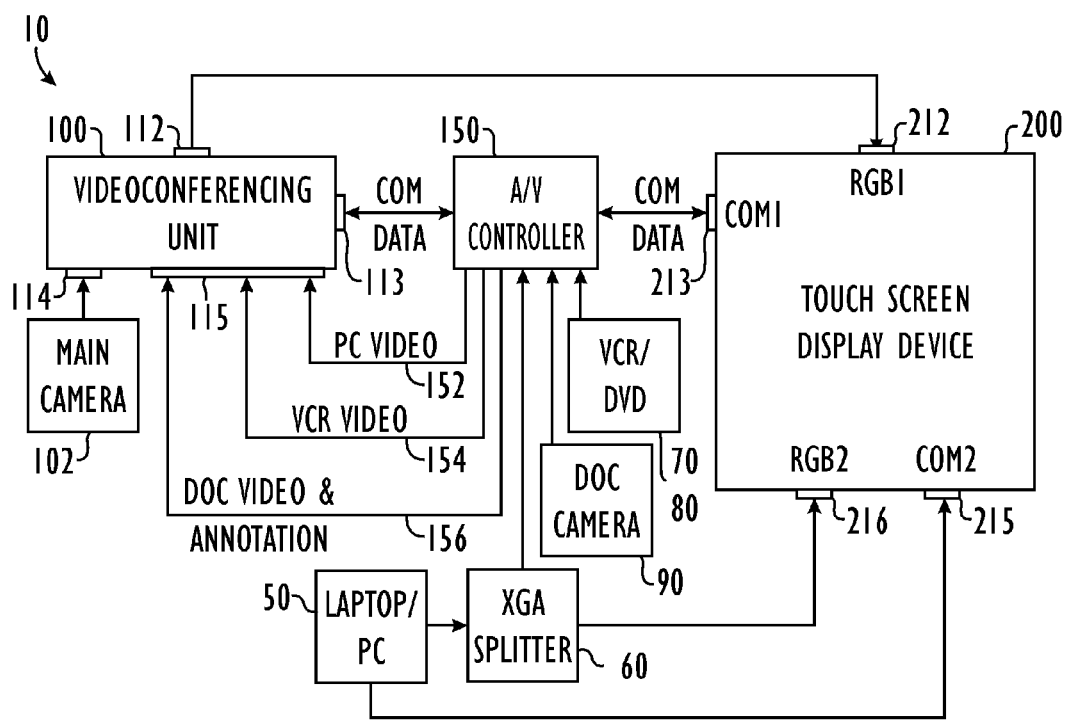
FIG. 2B illustrates a schematic diagram of another embodiment of the videoconferencing system.

Referring to FIGS. 2A and 2B, schematic diagrams of embodiments of the videoconferencing system 10 of FIG. 1 are illustrated. In the embodiment of FIG. 2A, the videoconferencing unit 100 of the system 10 is coupled directly to the touch screen display device 200. The discussion that follows focuses on video connections for the videoconference system 10. However, it will be appreciated that the videoconferencing system 10 can have audio connections. For example, the videoconferencing unit 100 can have audio connections to the display device 200 and can send audio data to speakers of the display device 200.

With respect to video connections of the system 10, a camera 102 couples to an input 114, such as an S-video connection, of the unit 100. The videoconferencing unit 100 has a video output 112 that couples to a video input 212 of the display device 200. For example, an XGA cable can be used to connect an XGA output 112 of the unit 100 to an RGB input 212 of the display device 200. The videoconferencing unit 100 also has a serial port 113 that couples to a serial port (COM1) 213 of the display device 200. The unit 100 and the display device 200 transfer data between one another using the serial ports 113 and 213. This data includes touch data obtained by the display device 200 and transferred to the unit 100, which uses the touch data for operation as discussed below. The transferred data also includes data generated by a user selecting a configured button on the control panel (not shown) of the display device 200.

The videoconferencing system 10 can also include a number of optional components useful for some implementations or functions of the system 10. For example, one or more optional VCRs or DVD players 70 or 80 can couple to one or more inputs 118 of the unit 100. In addition, an optional laptop or other computer 50 can couple to the touch screen device 200 though a serial port (COM2) 215. The coupling of the computer 50 to the serial port (COM2) 215 of the device 200 can allow the display device 200 to operate separately as an independent component from the videoconferencing unit 100—if the computer 50 has appropriate software.

The computer 50 can also couple to an Extended Graphics Array (XGA) Splitter 60 that couples to an input 116 of the videoconferencing unit 100 and couples to an RGB input 216 of the display device 200. The coupling of the computer 50 and splitter 60 to both the unit 100 and the device 200 allows the computer 50 to provide content, images, etc. on the computer to be displayed by the device 200 and to be manipulated and forwarded to remote endpoints (not shown) by the videoconferencing unit 100. In one embodiment, the computer 50 can have a graphical user interface for controlling operation of the videoconferencing unit 100—if the computer 50 has appropriate software integrating the computer 50 with the unit 100. The GUI for controlling the unit 100 with the computer 50 can be displayed on the display device 200 when operated in a "PC direct" mode of operation discussed below.

In the embodiment of the videoconferencing system 10 in FIG. 2B, the videoconferencing unit 100 again has its video output 112 directly coupled to the RGB input 212 of the display device 200. However, the serial port 113 of the unit 100 couples to an A/V controller 150 that in turn couples to the serial port (COM 1) 213 of the display device 200. Using the A/V controller 150, the unit 100 and the device 200 can transfer data between one another using the serial ports 113 and 213.

In one embodiment, the A/V controller 150 is a POINT-MAKER® PVI video marker, which is a programmable device that is used to control audio and visual devices and is available from Boeckeler Instruments, Inc. of Tucson, Ariz. The serial connection of the videoconferencing unit 100 to the A/V controller 150 via serial port 113 allows the unit 100 to control operation of the A/V controller 150.

As in the previous embodiment, the camera 102 couples directly to the camera input 114 of the unit 100. However, optional components, such as the VCR/DVD 70/80, a document camera 90, the computer 50, and the XGA splitter 60, are coupled to the A/V controller 150. In turn, the A/V controller 150 provides first video data 152 from the personal computer 50, second video data 154 from the VCR/DVD 70/80, and third video data 156 from the document camera 90 to one or more inputs 115 of the videoconferencing unit 100.

In the present embodiment, the document camera 90 can connect by an S-video cable to an S-video input of the A/V controller 150. In turn, an S-video cable from an S-video output of the A/V controller 150 can connect to a second camera input of the unit 100. The VCR/DVD 70/80 can connect by an RCA or BNC cable from a composite video output of the VCR/DVD 70/80 to a composite video input of the A/V controller 150. In turn, a BNC or S-video cable from a composite video output of the A/V controller 150 can connect to a VCR/DVD video input of the videoconferencing unit 100. The video from the A/V controller 150 can connect by a XGA/VGA cable from a VGA output of the A/V controller 150 to a VGA input of the videoconferencing unit 100.

Figure 3:
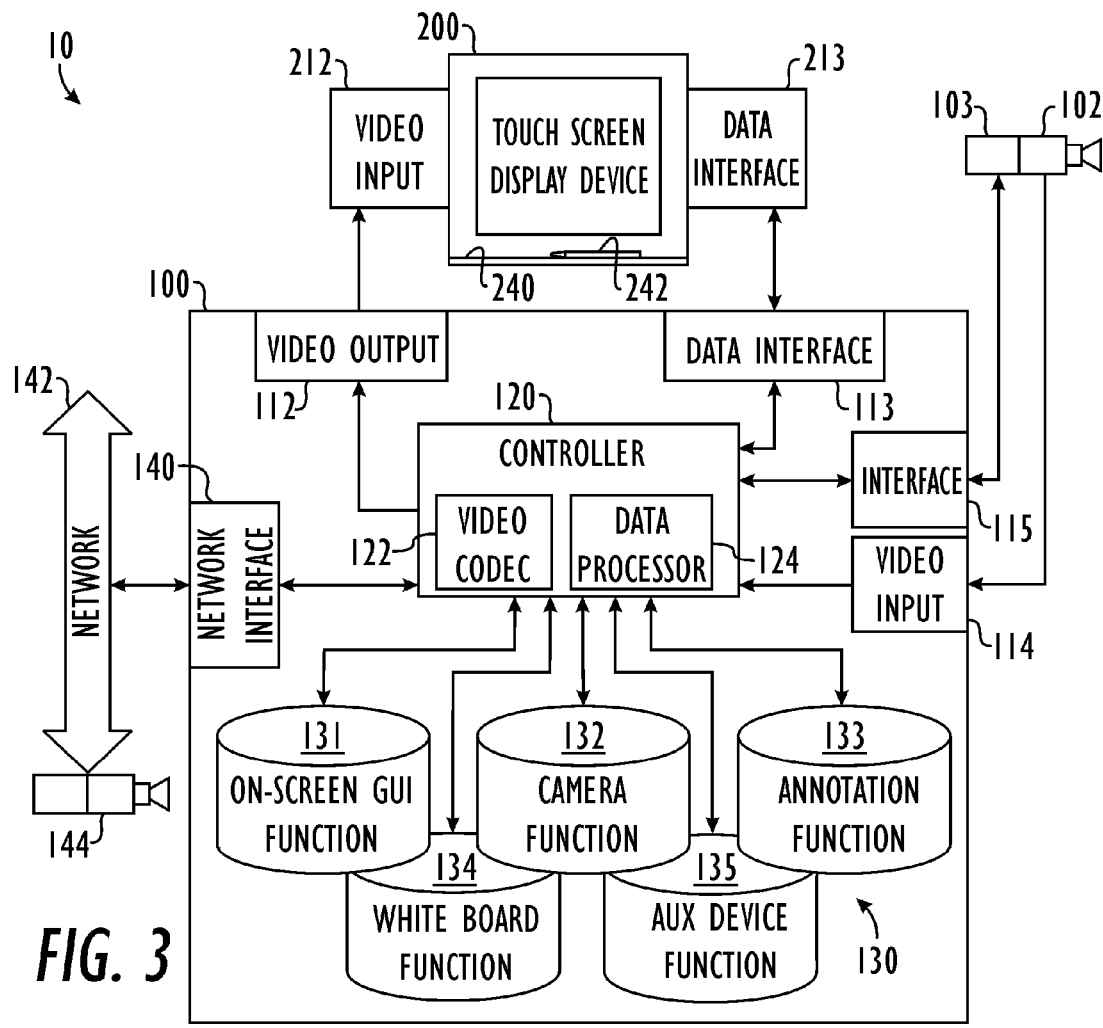
FIG. 3 schematically illustrates components of the videoconferencing unit.

Referring now to FIG. 3, additional components of the videoconferencing system 10 are schematically illustrated in more detail. The videoconferencing unit 100 has a controller 120, which can include any conventional encoders, processors, and other electronic components known in the art and used for a videoconferencing unit. The controller 120 is coupled to the output 112 for video, the serial port 113 for data interface, and memory 130 storing functions 131-135. The controller 120 is also coupled to an input 114 for video from a near camera 102 and can be coupled to an interface 115 for controlling the near camera 102. The video output 112 is coupled to the video input 212 of the display device 200, and the serial port 113 exchanges data with a serial port 213 of the display device 200. For example, the serial port 113 receives touch data from the display device 200, the port 113 can exchange control data with the display device 200.

The controller 120 includes a video codec 122 and a data processor 124. The video codec 122 is responsible for processing video data to be displayed by the display device 200 and to be sent to remote endpoints of the videoconference. In general, the video data can include images captured by the camera (not shown) of the unit 100, video from remote endpoints of the videoconference, content from a peripheral device (e.g., VCR, DVD player, computer, document camera, etc.), annotations from the display device 200, and other visual data. Operation of such a video codec 122 in the context of videoconferencing is well known in the art is not described herein.

The data processor 124 is responsible for processing data for the videoconferencing unit 100. This data includes touch data from the display device 200, communication data, commands, videoconference information, etc. The controller 120 is also coupled to a network interface 140, such as commonly used for a videoconferencing unit, and the network interface 150 couples to a videoconference network 142 known in the art.

The controller 120 controls operation of at least some features of the videoconferencing system 10 using the operational functions 131-135 stored in memory 130. These operational functions include an on-screen graphical user interface (GUI) function 131, a camera function 132, an annotation function 133, a white board function 134, and an auxiliary device function 135. Each of these operational functions 131-135 is discussed in more detail later, but a general overview of these functions 131-135 is provided here.

The on-screen GUI function 131 allows the videoconferencing unit 100 to display graphical user interfaces for controlling operation of the system 10 on the display device 200. The graphical user interfaces of the videoconference unit 100 can include a number of touch controls, menus, and dialogs that can be displayed on the display device 200 for a user to operate and control the system 10. For example, the graphical user interfaces of the unit 100 can allow the user to place a videoconference call through a directory, speed dial, or manual dial menu; answer an incoming videoconference call; hang-up a videoconference call; mute or change volume of audio; select camera and content sources, swap near and far video in picture-in-picture (PIP), and other operations disclosed herein.

The camera function 132 allows the videoconferencing unit 100 to display visual touch controls on the display device 200 for controlling operation of one or more cameras, such as near camera 102. In one embodiment, the near camera 102 is a pan-tilt-zoom camera capable of panning, tilting, and zooming. One or more of the panning, tilting, and zooming capabilities of the near camera 102 can be accomplished by one or more mechanical actuators 103, as are used in the art for operating pan-tilt-zoom cameras of videoconferencing units. The interface 115 is coupled to the actuator 103, and the controller 120 controls operation of the panning, tilting, and zooming capabilities of the near camera 102 using control signals via the interface 115. A user utilizing visual touch controls on the display device 200 can generate the control signals to control the panning, tilting, and zooming of the near camera 102.

Alternatively, the panning, tilting, and zooming capabilities of the near camera 102 may be electronically achieved. For example, the near camera 102 may have processing capabilities for panning, tilting, and/or zooming, and the controller 120 can control that processing using control signals via the interface 115. In another example, the controller 120 may instead having the processing capabilities for panning, tilting, and/or zooming, and the controller 120 can perform those operation based on video received from the near camera 102 via video input 114.

In addition to controlling the near camera 102, the camera function 132 allows the videoconferencing unit 100 to display visual touch controls on the display device 200 for controlling operation of a far-end camera 144 on the network 142. For example, the far-end camera 144 may be associated with a remote endpoint participating in the videoconference. Using the network interface 140, the controller can control the panning, tilting, and zooming capabilities of the far-end camera 144 using control signals. For example, the far-end camera 144 can be a pan-tilt-zoom camera having one or more mechanical actuators or having electronic processing capabilities. The controller 120 can use a far-end camera control protocol, such as H.224 that is described in Annex Q of H.323, for controlling the far-end camera 144 via the network interface 140.

The annotation function 133 allows the user to make annotations on video displayed on the display device 200, and the white board function 134 allows the user to make annotations on a white board displayed on the display device 200. Finally, the auxiliary device function 135 allows the videoconferencing unit 100 to display video from other auxiliary devices, such as a computer, laptop, VCR, DVD player, etc.

As will be apparent from the general description above, the operational functions 131-135 allow the videoconferencing unit 100 to operate the touch screen display device 200 in an annotation mode and in a touch control mode. Determination of which mode can depend on whether a pen or eraser tool 242 is picked up from the tray 240 of the display device 200. If a pen or eraser tool 242 is lifted off the tray, for example, the videoconferencing unit 100 can operate the display device 200 in the annotation mode so that the user can make annotations on video displayed on the device 200. The video can be of the videoconference or other content and can be from the videoconferencing unit 100, computer, laptop, VCR, DVD player, document camera, etc. When all of the tools 242 are placed in the tray 240, the videoconferencing unit 100 can operate the display device 200 in the touch control mode so that the user can control operation of the videoconference system 10 by touching areas of the display 200 corresponding to the graphical user interfaces, touch controls, menus, dialogs, etc. of the unit 100.

Provided the general overview of how the videoconferencing unit 100 controls operation of the videoconferencing system 10, reference is now made to FIGS. 4 through 8 for a more detailed discussion of the operational functions of the videoconferencing unit 100.

Figure 4:
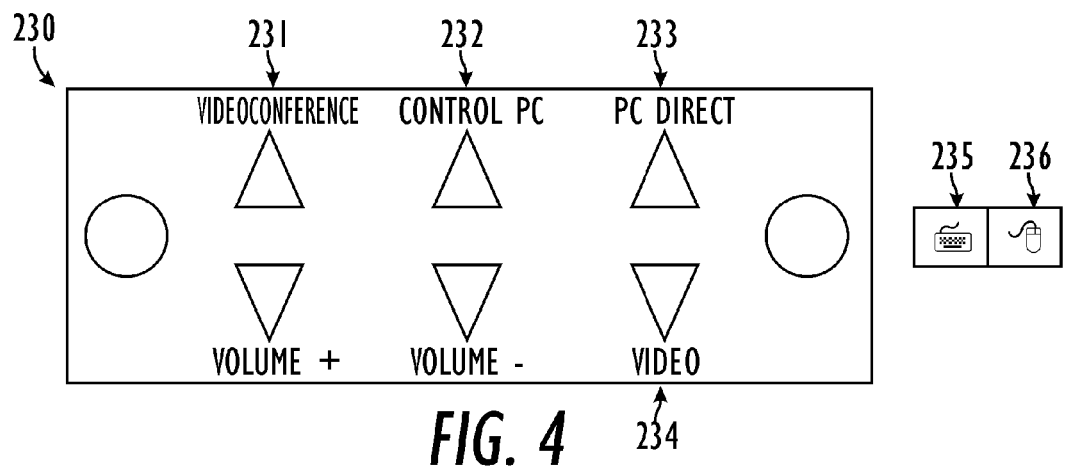
FIG. 4 illustrates an embodiment of a control panel of the touch screen display device.

As noted above, the videoconferencing unit 100 controls operation of the touch screen display device 200 using the auxiliary device function 135. One way for achieving this is accomplished by integrating controls on the control panel (230; FIG. 1) of the display device 200 with the videoconferencing unit 100. Referring to FIG. 4, an embodiment of the control panel 230 of the touch screen display device (not shown) is illustrated. As discussed previously, the touch screen display device is preferably a 3000i model SMART Board. As such, the control panel 230 of the 3000i model SMART Board has a plurality of buttons that are configured to control volume levels, brightness levels, and contrast levels of the display device. As part of the integration between the videoconferencing unit and the display device of the disclosed videoconferencing system, however, the buttons on the control panel 230 of the display device are reconfigured as illustrated in the embodiment of FIG. 4. (For convenience, reference is concurrently made in FIG. 4 to reference numerals for components in FIG. 1 of the present disclosure).

The control panel 230 includes a first button 231 configured to initiate a videoconference mode of operation. In this mode, the videoconferencing unit (100) establishes and conducts a videoconference by establishing a videoconference connection with remote endpoints via a network, by sending video of the videoconference to the RGB input of the display device (200), and by transferring graphical user interfaces and touch data between the display device (200) and the unit (100).

A second button 232 of the panel 230 is configured to initiate control of a personal computer (50) if coupled to the disclosed videoconferencing system. In this mode, content from the computer (50) can be shown during the videoconference. This content can include screens of the computer, video or other images stored on the computer, PowerPoint presentations, files, etc. During a videoconference, the content from the computer (50) is processed by the videoconferencing unit (10) and is sent to the display device (200). The content can also be sent to remote endpoints of the videoconference.

A third button 233 of the panel 230 is configured to initiate a PC direct mode of operation. In this mode, video data from the computer (50) is sent to the RGB input of the display device (200) directly from the XGA output from the splitter (60) rather than from the video codec of the videoconferencing unit (100). This could be done whether in a videoconference call or not or can be done whether computer's content is sent to other endpoints or not. A fourth button 234 of the panel 230 is configured to initiate a video mode of operation in which the display device (200) is operated to receive video by an S-Video connection from a connected source.

In addition to the buttons on the control panel 230, the display device (200) also includes other buttons 235 and 236 on the device's tray (240). These buttons 235 and 236 are shown in FIG. 4 apart from the tray (240) for convenience. The first tray button 235 is originally configured to access an on-screen keyboard on the screen of the display device (200) when operated with software of a coupled computer or laptop. For the videoconferencing system (10) of the present disclosure, however, pressing this keyboard button 235 is reconfigured to access an on-screen keyboard of the videoconferencing unit (100) if all the pens (242) on the tray (240) of the display device (200) are down and if the unit (100) is generating a screen where display of the keyboard is appropriate. If a pen (242) is lifted from the tray (240), however, this button 235 is configured to access a calibration screen of the A/V controller (150; FIG. 2A) if it is component of the implementation of the videoconferencing system (10). With the accessed calibration screen, the user can calibrate the A/V controller (150; FIG. 2B) using the touch screen display device (200).

The second tray button 236 is originally configured to operate as a right-mouse click when the display device (200) is operated with software of a coupled computer or laptop (50). For the videoconferencing system (10) of the present disclosure, however, pressing this button 236 is reconfigured to start and stop VGA graphics of the videoconferencing unit (100) if the pens (242) on the tray (240) of the display device (200) are down. If a pen (242) is lifted from the tray (240), this button 236 is configured to access a menu of the A/V controller (150; FIG. 2B) if it is part of the implementation. With the accessed menu screen, the user can control operation of the A/V controller (150; FIG. 2B) using the touch screen display device (200).

Returning briefly to FIG. 3, the videoconferencing unit 100 has an on-screen GUI function 131, as previously discussed, for displaying user interfaces, menus, touch controls, dialogs, etc. on the display device 200 used to control operation of the system 10. Part of the on-screen GUI function 131 involves displaying touch controls on the display device 200 and receiving touch data at the videoconferencing unit 100 from the display device 200 with respect to those touch controls to control operation of the system 10. In other words, the display device 200 is used to detect information, selections, annotation from a user's touch, electonic pen, etc. on the touch screen display device 200. This detected touch data is sent to the videoconferencing unit 100. In turn, the touch data is used to operate the videoconferencing system 10.

For example, a touch or release in an area of the touch screen of the display device 200 causes an event that corresponds to the touch and/or release of a feature configured for the user interface of the videoconferencing unit 100. If the user's touch is on an area of the screen that is not designated as a touch control of the user interface of the unit 100, then the touch data may be processed by a supervisory algorithm that can access camera controls or bring up a main menu or the like. Accordingly, the unit 100 determines whether a graphical user interface (GUI) and/or video is currently being displayed on the display device 200. If the unit 100 is showing a GUI, for example, then the user will be able to use a finger or electronic pen 242 to touch the screen of the display device 200 and produce inputs to the videoconferencing unit 100.

Figure 5:
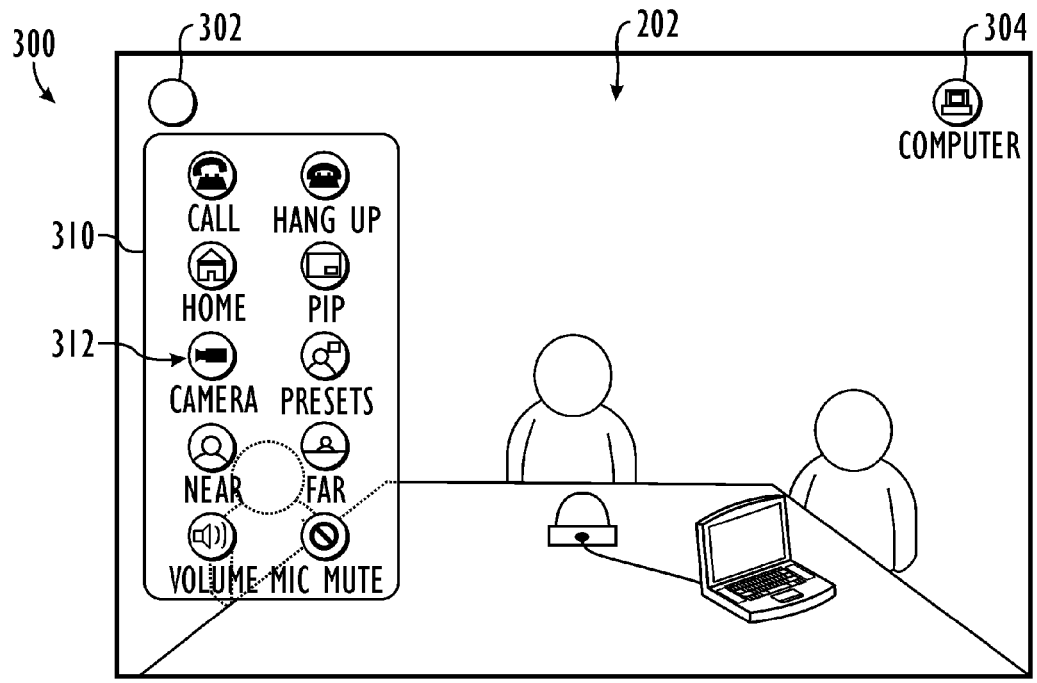
FIG. 5 illustrates an embodiment of a menu function of the videoconferencing system.

Referring to FIG. 5, an embodiment of a menu 310 generated by the videoconferencing unit (100) is illustrated on the touch screen 202 of the display device (200). The menu 310 can be invoked when the user selects a button 302 displayed on the top left of the screen 202 while video is being displayed. Preferably, the button 302 is transparent or hidden and is available from all screens including those containing video of participants and content. Once invoked, the menu 310 allows the user to control the videoconferencing system by using interactive touch directly on the screen 202. Preferably, the menu 310 is transparent and displayed over video currently displayed on the screen 202.

The menu 310 includes a plurality of touch controls 312 similar to a buttons available on a remote control. These touch controls 312 include a Home button, a Call button, a Hang-Up button, a Volume button, a Mute button, a Cameras button, a picture-in-picture (PIP) button, a Near button, a Far button, a Preset button, and a Close button. These and other buttons may be provided in the menu 310 depending on the implementation. For example, some other possible buttons include buttons for bringing up help and buttons for an on-screen keyboard.

The touch controls 312 can operate similar to corresponding controls found on a physical remote. Here, the difference is that designated areas of the video data displayed on the screen 202 are associated with touch controls used to control and operate the videoconferencing system. For example, selecting the Call button on the menu 310 can initiate a videoconference call. To initiate the call, a Speed Dial dialog or an address book dialog may be accessed on the screen 202 to select with which remote endpoints to establish the videoconference. Selecting the Hang-up button on the menu 310 can end a videoconference call or can bring up a hang-up dialog on the screen 202 if there is more than one call currently active. Selecting the Volume button on the menu 310 can bring up a volume bar on the screen 202, and then user can touch on the Volume bar displayed on the screen 202 to control the volume. The Mute and PIP on the menu 310 can be toggling buttons for muting the audio and producing picture-in-picture on the screen 202.

Selecting the Preset button on the menu 310 can bring up a Preset dialog on the screen 202, and the user can select from a plurality of stored presets or touch and hold to store a preset. Selecting the camera button on the menu 310 can bring up a dialog on the screen 202 that lists video sources (e.g., camera, computer, etc.), and the user can touch on an appropriate button on the list to select a desired video source. The near and far buttons on the menu 310 allows the user to select and control the near camera (i.e., the one coupled to the videoconferencing unit (100)) or one or more of the far cameras associated with the endpoints of the videoconference.

Figure 6:
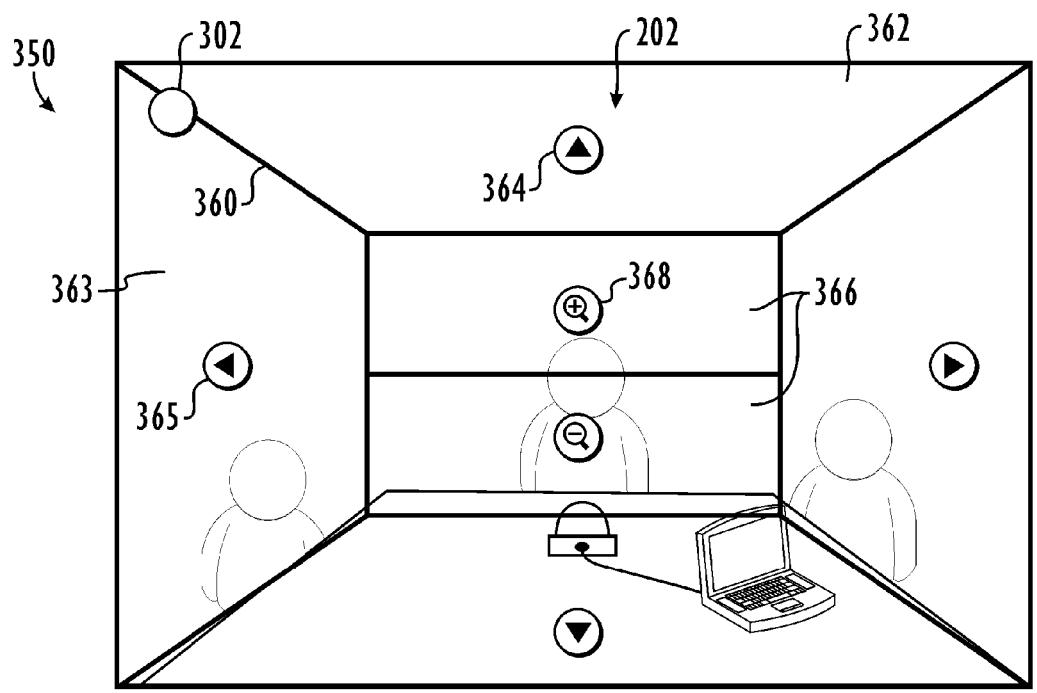
FIG. 6 illustrates an embodiment of a camera function of the videoconferencing system.

As discussed previously, the videoconferencing unit 100 of FIG. 3 also has the camera function 132 for controlling the camera. Part of the camera function 132 involves displaying camera controls on the display device 200 and receiving touch data from a user with respect to those camera controls to control operation of the camera. Referring to FIG. 6, an embodiment of camera controls 350 generated by the videoconferencing unit is illustrated on the touch screen 202 of the display device. The camera controls 350 allow the user to control a pan-tilt-zoom camera using intuitive touch on the screen 202. When full screen video is being displayed on the screen 202, then touching anywhere on the screen while the pens or eraser tools (242; FIG. 1) are down will bring up a watermark grid 360 displayed over the active video. Control icons 364 and 368 are positioned in areas 362 and 366 of the watermark grid 360. By touching in a pair of upper and lower areas 362 of the grid 360 associated with the control icons 364, the user can tilt the tilt-pan-zoom camera of the connected videoconferencing unit or of a remote endpoint participating in the videoconference. By touching in a pair of right and left areas 363 of the grid 360 associated with the control icons 365, the user can pan the tilt-pan-zoom camera of the connected videoconferencing unit or of a remote endpoint participating in the videoconference. By touching in the pair of inside areas 366 of the grid 360 associated with the other control icons 368, the user can zoom the camera of the connected videoconferencing unit or of a remote endpoint participating in the videoconference.

Figure 7:
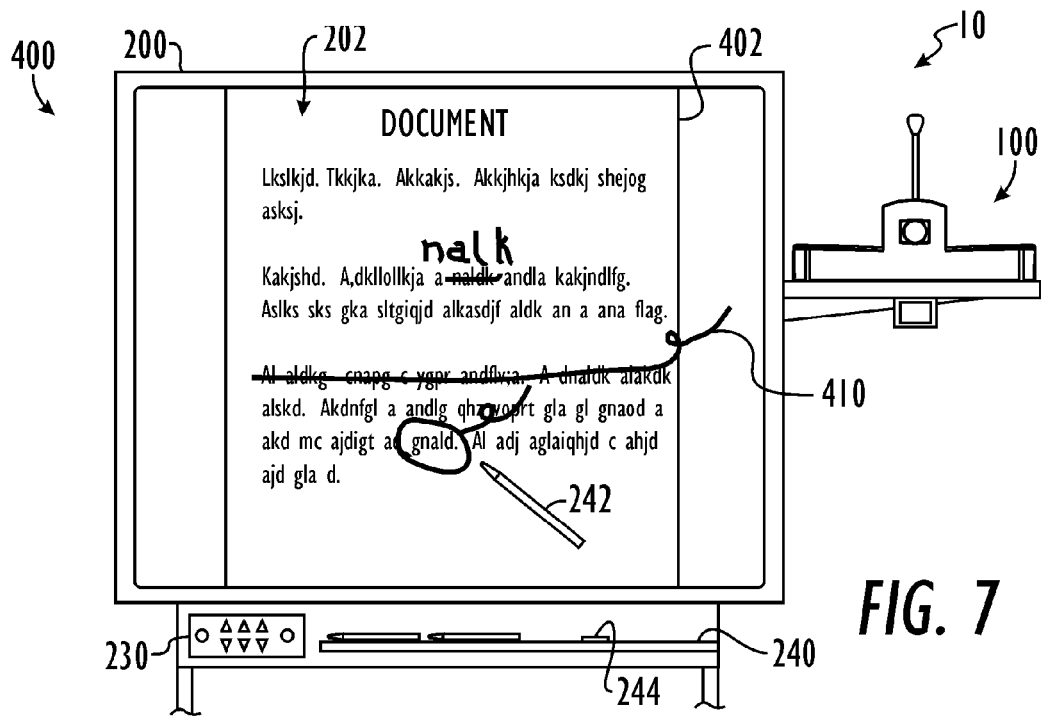
FIG. 7 illustrates an embodiment of an annotation function of the videoconferencing system

Determining which camera (e.g, near or far-end) associated with the videoconference is controlled depends on which video is currently being displayed on the screen 202. For example, if video of a far-end camera associated with an endpoint of the videoconference is currently displayed on the screen, then touching the areas 362, 363, and 366 associated with the grid 360 will control the pan, tilt, and zoom of the far-end camera using the techniques disclosed herein. If video of the near camera connected to the videoconferencing unit associated with the screen 202 is currently being displayed, then touching the areas 362, 363, and 366 associated with the grid 360 will control the pan, tilt, and zoom of the near camera using the techniques disclosed herein As discussed previously, the videoconferencing unit 100 of FIG. 3 has the annotation function 133 for adding annotations to displayed video. Referring to FIG. 7, portion of the videoconferencing system 10 is shown operating in an annotation mode 400. In the annotation mode 400, a user can make annotations 410 over video currently displayed on the screen 202. The annotations 410 can be made with an electronic pen 242 and can be made while either on or off an active videoconference call. If the user wants to write on a displayed object 402 (e.g., a displayed document from a connected document camera or a computer) on the screen 202, then the videoconferencing system 10 automatically goes into the annotation mode 400 of operation as soon as the user picks up the electronic pen 242 from the tray 240. As discussed previously, optical sensors 244 on the tray 240 of the display device 200 can be used to detect when the user picks up the pen 242 from the tray 240. This data is sent from the display device 200 through the data interface with the videoconferencing unit 100 where the controller (120; FIG. 3) of the unit 100 access the annotation function (133; FIG. 3).

In the annotation mode, the user is able to make annotations 410 on various video or images displayed on the screen 202 of the display device 200. The video and images can include videoconference video from the videoconferencing unit 100, video from a document camera, video from a VCR or DVD player, or a computer screen image from a connected computer. The video from the document camera, VCR, and DVD player can comply with the National Television Standards Committee (NTSC) or Phase Alternating Line (PAL) standards. The computer screen image can be XGA having a resolution of 1024×768.

When annotations 410 are made on the screen 202, the graphical elements of the annotations 410 are combined with the displayed video. By combining the annotations 410 with the displayed video, the annotations 410 can be readily sent to far endpoints of the videoconference as part of the compressed video bit stream sent from the unit 100 to remote endpoints over the videoconference network.

In one embodiment, the user can make annotations 410 to content provided by the computer. Preferably, annotating content from the computer. The content can be of a whiteboard, a computer screen, an image, or visual media from the computer. For example, the computer (50; FIG. 2A-2B) can be designated as the source of content for display on the screen 202 of touch screen device 200. During a videoconference, the user can pick up a user tool 242 from the tray 240 of the touch screen device 200, and the videoconferencing system 10 automatically switches to the annotation mode of operation. Once in the annotation mode of operation, the computer (50) receive touch data from the touch screen device 200 and combines the received touch data as annotation to the computer's content. The computer (50) sends this annotated content to the touch screen device 200 for display and sends it to the videoconferencing unit 100. In turn, the videoconferencing unit 100 receives the annotated content from the computer (50) and sends the received annotated content to the endpoints (not shown) of the videoconference via the unit's network interface (140; FIG. 3). Thus, annotations can be made to content and sent automatically to far-end endpoints via the network.

Sending the annotated content preferably involves combining the annotation data and content data together so that the combination can be sent in the H.239 standard through the network. Furthermore, handling annotations and content for display on the touch screen device 200 with the computer (50) can avoid issues with delay that conventionally occur when a user makes annotations during a videoconference. Specifically, handling annotations and content with the computer (50) avoids the need of having the videoconferencing unit 100 handle the annotations and content and send that annotated content to the touch screen device 200 for display. Such a feedback arrangement typically results in a delay between what annotations the user is currently making on the screen 202 of the display device 200 and how much of the annotation 410 is being displayed. Any significant delay is generally undesirable.

Figure 8:
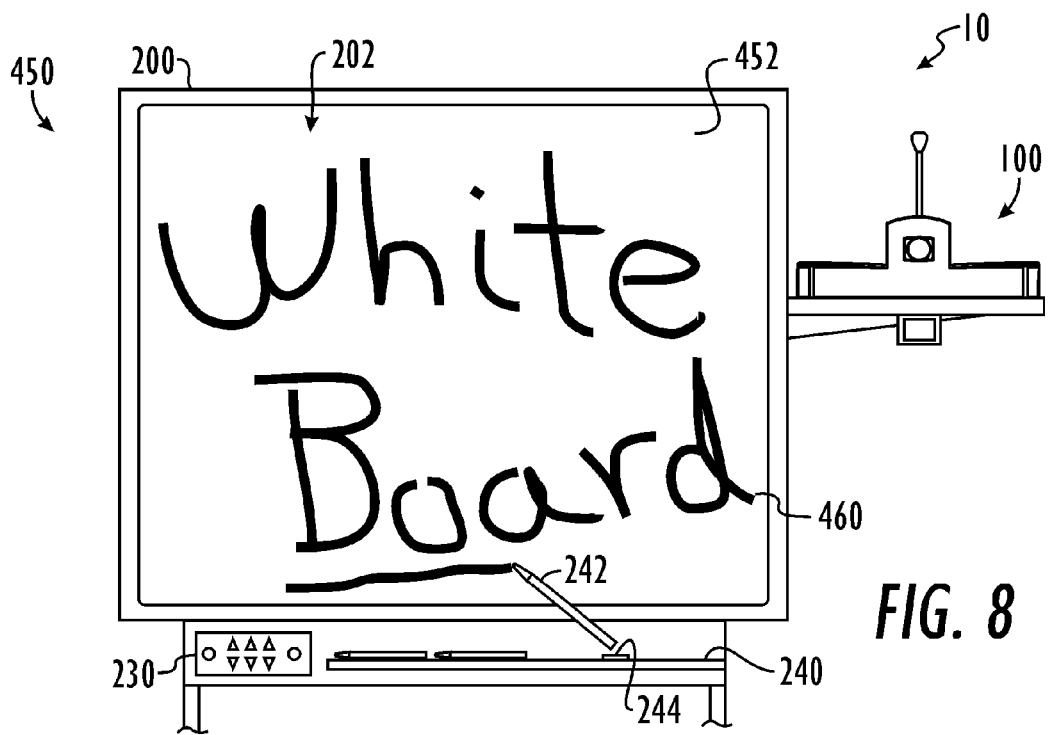
FIG. 8 illustrates an embodiment of a whiteboard function of the videoconferencing system.

As discussed above, the videoconferencing unit 100 of FIG. 3 also has the whiteboard function 134 for allowing the display device 200 to be used as a whiteboard. Referring to FIG. 8, portion of the videoconferencing system 10 is shown operating in a whiteboard mode 450. To access this mode 450, a user picks up an electronic pen 242 from the tray 240 of the display device 200, and the videoconferencing system 10 automatically goes into the whiteboard mode 450 of operation if another source of video (e.g., document camera, computer, VCR, DVD player, etc.) is not already selected. The user can then start writing annotations 460 on the whiteboard content 452 displayed on the screen 202. The whiteboard content 452 is preferably an XGA image having a resolution of 1024×768. The user can make annotations 460 on the whiteboard content 452 regardless of whether the system 10 is in a videoconference call or not. When in a videoconferenc call, however, the whiteboards content 452 with the annotations 460 can be sent to remote endpoints by the videoconferencing unit 100.

As discussed previously with reference to FIGS. 2A-2B, the system 10 may not include a computer. Lacking a computer, the videoconferencing unit 100 can generate a whiteboard on its own. When the system 10 is currently displaying video data of a graphical user interface or the camera on the display device 200, the videoconferencing unit 100 automatically goes into the annotation mode of operation when the user picks up the pen 242 from the tray 240. In the annotation mode, the videoconferencing unit 100 generates the whiteboard content 452. The videoconferencing unit 100 receives touch data from the display device and combines the touch data as annotations 460 to the whiteboard content 452. The videoconferencing unit 100 then sends the annotated whiteboard to the display device 200 and sends it to one or more remote endpoints of the videoconference as H.239 content. In an alternative embodiment, however, the system 10 can use an optional computer (50; FIG. 2A-2B) to handle the whiteboard content 452 and the annotations 460 so that the videoconferencing unit 100 can send the annotated whiteboard to the one or more remote endpoints of the videoconference as H.239 content.

As noted previously, an optional computer (50; FIGS. 2A-2B) can connected to the system 10. Picking up a pen 242 from the tray 240 can cause the system 10 to pick a VGA or video source automatically for displaying full screen on the display device 200 and for sending to remote endpoints of the videoconference. For example, rather than showing the whiteboard 452 as the background of the display, a computer screen from the optionally connected computer (50) can be shown. The choice of which VGA or video source depends on which sources are currently selected for the system 10. For example, behavior regarding video annotation can be controlled by the A/V controller 150 integrated with the system 10, and the A/V controller 150 can be configured to provide the features disclosed herein for annotating video and switching between sources.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconferencing system for a plurality of sources of video data, comprising:
   a touch screen device configured to display video data and generate touch data with a touch sensor,
   a tool sensor, associated with a user tool for the touch screen device and generating an indication when the user tool is moved relative to the tool sensor; and
   a videoconferencing unit operatively coupled to the touch screen device and the sources of video data, the videoconferencing unit configured to:
      establish a videoconference with one or more endpoints via a network,
      receive video data from one or more of the sources of video data,
      send received video data to the touch screen device for display and to the one or more endpoints via the network,
      wherein when the user tool is moved, the videoconferencing unit receives the indication that the user tool has been moved and is configured in response to automatically:
      select one of the sources of video data
      switch from a current source of video data to the selected source of video data, and
      send video data from the selected source to the touch screen device and to the one or more endpoints.

2. The videoconferencing system of claim 1, wherein the system comprises at least one camera capable of at least one of panning, tilting, or zooming; and wherein the videoconferencing unit is configured to:
   send video data received from the at least one camera to the touch screen device for display,
   designate at least one area of sent video data as at least one touch control for user selection, the at least one touch control for controlling the pan, tilt, or zoom of the at least one camera,
   receive touch data from the touch screen device,
   associate received touch data with the at least one touch control, and
   control operation of the at least one camera based on the associated touch control.

3. The system of claim 1, wherein the at least one camera comprises a mechanical actuator for panning, tilting, or zooming the at least one camera, and wherein to control operation of the at least one camera based on the associated touch control, the videoconferencing unit is configured to send a control signal to the mechanical actuator.

4. The system of claim 1, wherein the at least one camera comprises an electronic processing capability for panning, tilting, or zooming video data captured by the at least one camera, and wherein to control operation of the at least one camera based on the associated touch control, the videoconferencing unit is configured to send a control signal to the at least one camera to perform the electronic processing capability.

5. The system of claim 1, wherein the at least one camera comprises a far-end camera coupled to one of the endpoints, and wherein to control operation of the far-end camera based on the associated touch control, the videoconferencing unit is configured to send a control signal to the far-end camera via the network.

6. The system of claim 1, wherein the at least one camera comprises panning, tilting, or zooming capabilities that are mechanically actuated or digitally achieved.

7. The system of claim 1, wherein the at least one camera comprises a pan-tilt-zoom camera, and wherein to designate at least one area of sent video data as at least one touch control for user selection, the videoconferencing unit is configured to generate a grid for display in conjunction with video data sent to the touch screen device, the grid having at least one area corresponding to the at least one touch control for controlling the pan, tilt, or zoom of the at least one camera.

8. The system of claim 7, wherein the grid comprises a first pair of areas corresponding to first touch controls for panning the pan-tilt-zoom camera, a second pair of areas corresponding to second touch controls for tilting the pan-tilt-zoom camera, and a third pair of areas corresponding to third touch controls for zooming the pan-tilt-zoom camera.

9. The system of claim 1, wherein the at least one camera comprises first and second cameras, and wherein to control operation of the first and second cameras based on the associated touch control, the videoconferencing unit is configured to:

determine which one of the first and second cameras currently has video data being sent to the touch screen device, and control operation of the one determined camera based on the associated touch control.

10. The system of claim 1, wherein the first camera comprises a near camera associated with the videoconferencing unit, and wherein the second camera comprises a far-end camera associated with one of the endpoints of the videoconference.

11. The system of claim 1, wherein the sources of video data are selected from the group consisting of a network interface coupled to the one or more endpoints via the network, a camera, a video cassette recorder, a digital versatile disc player, a laptop computer, a personal computer, a programmable controller of visual sources, and an Extended Graphics Array splitter.

12. The system of claim 1, wherein to automatically switch from the current source of video data to the selected source of video data, the videoconferencing unit is configured to:
generate a whiteboard in response to the moved user tool,
receive touch data from the touch screen device,
combine the received touch data as annotation to the whiteboard, and
send the annotated whiteboard to the touch screen device for display and to the one or more endpoints of the videoconference via the network.

13. The system of claim 1, wherein:
the touch screen device comprises a first data interface,
the videoconferencing unit comprises a second data interface coupled to the first data interface, and
the second data interface receives touch data from the first data interface of the touch screen device.

14. The system of claim 13, further comprising:
a computer having a video output and having a data interface coupled to another data interface of the touch screen device; and
an extended graphics array splitter having a video input coupled to the video output of the computer, the splitter having a video output coupled to a video input of the videoconferencing unit and having another video output coupled to another video input of the touch screen device.

15. The system of claim 13, further comprising a visual controller having data interfaces coupled between the first and second data interfaces of the videoconferencing unit and the touch screen device.

16. The system of claim 15, wherein one or more of the sources of video data are coupled to one or more video inputs of the visual controller, and wherein the visual controller comprises one or more video outputs coupled to one or more video inputs of the videoconferencing unit.

17. The system of claim 1, wherein the tool sensor is disposed on a tray of the touch screen and generates the indication when the user tool is picked up from the tray.

18. The system of claim 17, wherein the tool sensor senses at least one of a pen and an eraser as the user tool disposed on the tray.

19. The system of claim 17, wherein the tool sensor comprises an optical sensor disposed on the tray.

20. A videoconferencing system, comprising:
a touch screen device configured to display video data and generate touch data, the touch screen device comprising first and second video inputs and first and second data interfaces, the touch screen device having a user tool and a sensor, the sensor generating an indication when the user tool is moved relative to the sensor;
a computer coupled to the first video input and the first data interface of the touch screen device, the computer having a video output for content; and
a videoconferencing unit coupled to the video output of the computer and coupled to the second video input and the second data interface of the touch screen device, the videoconferencing unit having a network interface establishing a videoconference with one or more endpoints via a network;
wherein in an annotation mode of operation, the computer is configured to:
receive touch data from the touch screen device, and
combine received touch data as annotation to content, and
send annotated content to the touch screen device for display and to the videoconferencing unit,
wherein the videoconferencing system is configured to automatically switch to the annotation mode of operation in response to the indication, and
wherein in the annotation mode of operation, the videoconferencing unit is configured to:
receive annotated content from the computer, and
send received annotated content to the endpoints via the network.

21. The system of claim 20, wherein the content sent from the computer in the annotation mode of operation comprises a whiteboard, a computer screen, an image, or visual media.

22. The system of claim 20, further comprising:
an extended graphics array splitter having a video input coupled to the video output of the computer, the splitter having a video output coupled to a video input of the videoconferencing unit and having another video output coupled to the first video input of the touch screen device.

23. The system of claim 22, further comprising a visual controller having data interfaces coupled between a data interface of the videoconferencing unit and the second data interface of the touch screen device.

24. The system of claim 23, wherein at least one source of video data is coupled to a video input of the visual controller, and wherein the visual controller comprises a video output coupled to a video input of the videoconferencing unit.

25. The system of claim 24, wherein the at least one source of video data is selected from the group consisting of a camera, a video cassette recorder, and a digital versatile disc player.

* * * * *